United States Patent [19]
Gräfe

[11] Patent Number: 5,837,082
[45] Date of Patent: Nov. 17, 1998

[54] METHOD OF MANUFACTURING PRISMS, PARTICULARLY MICROPRISMS AND BEAM-SPLITTING PRISMS

[76] Inventor: Günther Gräfe, Siedlung 16, 07774 Camburg, Germany

[21] Appl. No.: 628,670
[22] PCT Filed: Aug. 17, 1995
[86] PCT No.: PCT/DE95/01081
   § 371 Date: Jul. 25, 1996
   § 102(e) Date: Jul. 25, 1996
[87] PCT Pub. No.: WO96/05525
   PCT Pub. Date: Feb. 22, 1996

[30] Foreign Application Priority Data

Aug. 17, 1994 [DE] Germany .......................... 44 29 080.2

[51] Int. Cl.⁶ .................................................. B32B 31/00
[52] U.S. Cl. ........................... 156/154; 156/250; 359/831; 451/41
[58] Field of Search ..................... 156/299, 300, 156/250, 557, 558, 559, 154; 359/615, 831, 834; 451/41

[56] References Cited

U.S. PATENT DOCUMENTS

Re. 26,617  6/1969  Staunton .............................. 359/615 X
3,254,556  6/1966  Staunton .............................. 359/615

*Primary Examiner*—James Engel
*Attorney, Agent, or Firm*—Friedrich Kueffner

[57] ABSTRACT

Figure 5:
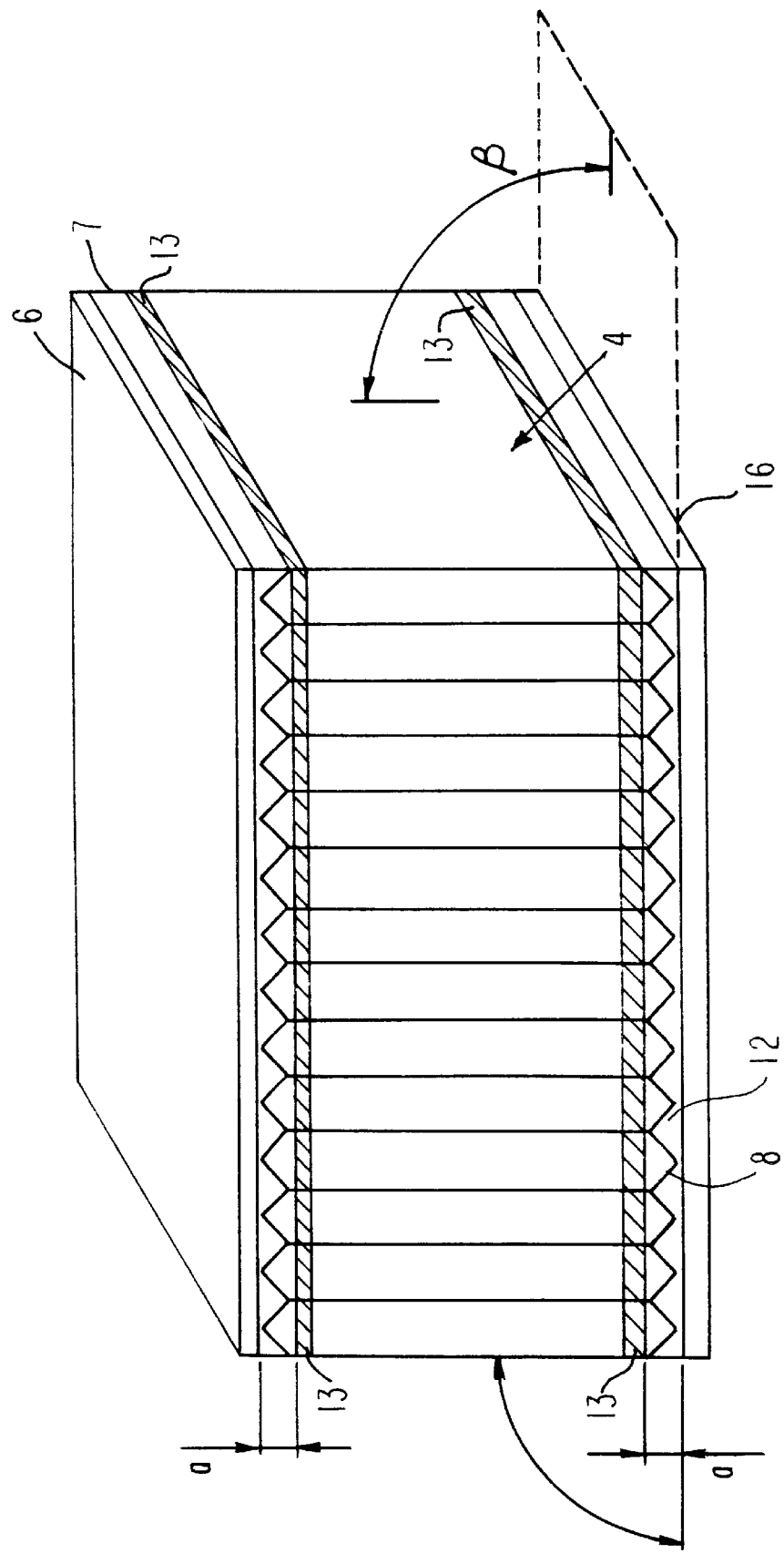

The invention relates to a method of manufacturing prisms, particularly microprisms and beam-splitting prisms, including the following steps: a) producing rectangular plates (1), b) fixing a larger number of these plates at their plate surfaces (2) to form a rectangular block (4), c) processing at least one face (support face 5) of the block at a right angle relative to the plate surfaces, d) rearranging the plates of the blocks so that all plate surfaces are aligned at an angle $\alpha_1$ and that the sharp edges of the plates are placed in contact with the alignment plate (6), e) cementing of several displaced blocks with their cover faces (11) to a carrier body and grinding and polishing the support face (5), f) multiple repetition, if necessary, of steps d) through e) with different angles adjustments $\alpha$, g) rearranging the plates of the blocks so that all plate surfaces are arranged at an angle $\beta$, h) cementing an auxiliary plate (16) to the optically effective surfaces (8, 12), i) cutting off prism strips (18) at a distance a from the surface of the auxiliary plate (16), j) cutting off the microprisms (10), k) detaching the microprisms from the auxiliary plate (16). Very different shapes of microprisms can be produced (FIG. 5).

19 Claims, 11 Drawing Sheets

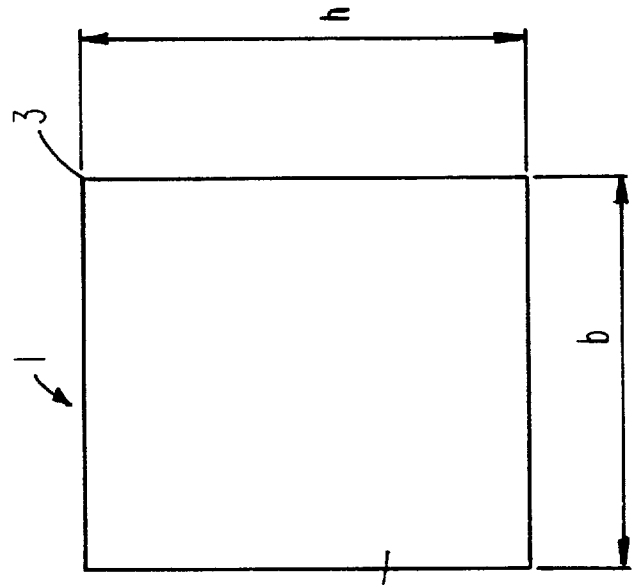
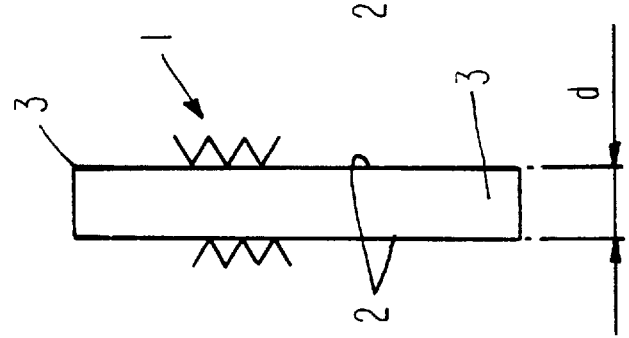

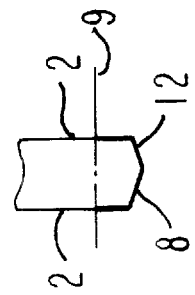
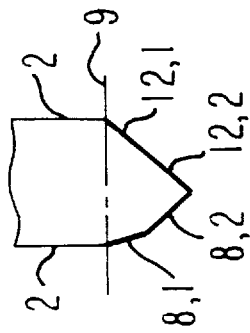
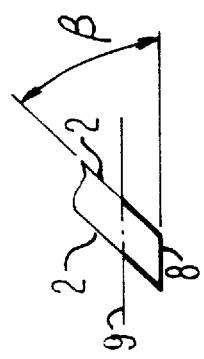
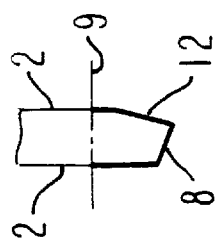

1

METHOD OF MANUFACTURING PRISMS, PARTICULARLY MICROPRISMS AND BEAM-SPLITTING PRISMS

SPECIFICATION

TITLE OF THE INVENTION

Method of manufacturing prisms, particularly microprisms and beam-splitting prisms

FIELD OF APPLICATION

The invention relates to a method of manufacturing prisms, particularly microprisms and beam-splitting prisms, the dimensions of which may be in the range of $\mu$m. Microprisms are used, for example, for the redirection of beams in endoscopes or for the introduction of light in microoptical or microelectronical structures. The beam-splitting prisms are composed of at least two combined prismatic glass elements with a thin partially transparent layer being disposed between the contact surfaces of the elements.

PRIOR ART

U.S. Pat. No. 3,254,556 describes a method for the production of microprisms composed of plates, wherein several plane-parallel plates are stacked with their faces being in contact, wherein the plates are displaced relative to each other in such a way that they constitute a body with the outline of a parallelogram.

The plates are fixed with respect to each other in this displaced position. Thereafter, the resulting body is cut with a saw, wherein the planes of cutting extend parallel to the inclined face of the parallelogram-shaped body which has the stepped surface structure. Thus, a plurality of microprism plates are obtained from the block of plane-parallel plates which are offset relative to each other.

From the Japanese specification JP 5-66 303 is known a method for the production of prisms that are to be used as beam-splitting prisms, wherein first a plurlity of rectangular plane-parallel plates are manufactured. On the surface of each plate a thin layer of dielectric material is deposited that later on serves for the splitting of the beams. Then, a rectangular block is formed by stacking several plates with their faces in contact, wherein the plates are aligned at two of their circumferential sides and their faces. The plates of the resulting rectangular block are displaced relative to each other parallel to their faces by a distance that corresponds to the thickness of the plates, so that a body with parallelogram-shaped cross section is formed. With a subsequent first sawing procedure, the stepped projections are removed from one side of the parallelogram-shaped body which projections were formed by the displacement of the plates, so that a continuous, smooth face is obtained that is polished after the cutting procedure. With this face the parallelogram-shaped body is fixed to a auxiliary plate, so that it can be subjected to a further sawing procedure. During sawing, the cuts are oriented perpendicular to the plane of the auxiliary plate and along those lines where the beam-splitting layers hit the auxiliary plate between the plates. The plate-like elements thus obtained are divided with two further cutting procedures in such a way that cubic beam-splitting prisms are obtained.

This procedure is feasible with beam-splitting cubes having generally used dimensions that can be handled and processed as a single element, but it fails in the case of microoptical components.

OBJECT OF THE INVENTION

New possibilities of application in microoptics and optoelectronics require inexpensive microprisms and beam-splitting prisms in large numbers. The invention is to solve the problem of manufacturing microprisms and beam-splitting prisms with reasonable effort much less expensively and as much smaller optical components than usual in the past. The microprisms and beam-splitting prisms should satisfy high demands concerning their precision.

DESCRIPTION OF THE INVENTION

In accordance with the invention, the object is met by the features of claim 1. Claims 2 to 13 represent advantageous further developments of the main claim. The invention relates to a process for the production of prisms. It is especially desired to inexpensively manufacture microprisms or beam-splitting prisms with very variable geometrical shapes.

The prisms are produced from plane-parallel rectangular plates in several steps, which partially may be repeated several times with different parameters, e.g. angle settings.

Starting material for the prisms are rectangular plates with parallel plane surfaces on both sides. It is sufficient if the side faces of the plates are cut to size. The dimensions of the sides of the plates should be chosen relatively large. The larger the width b of the supporting side of the plate, the more microprisms can be obtained with one process. The larger the height h, the higher the number of cycles that a given set of plates can be used in the production of microprisms. The larger the height h, the more precise angles of the prisms can be achieved. Normally, the surfaces of the plates are smoothly ground. If the plates are to be fixed by wringing and/or parts of the plates are intended to perform optical functions, then the faces of the plates are additionally polished. A larger number of plates are fixed with their faces to form a rectangular block, wherein the individual plates are aligned according to at least two side faces and the plate surfaces. For the highest possible precision, it is advantageous if that side face that forms the support face is worked in a right angle with respect to the plate surfaces of the plates, so that a sharp edge is formed between the plate surfaces of the plate and the support face. The number of plates cemented together results in the length of the block. Fixation of plates as a block is achieved by a meltable fixation agent or by wringing. By wringing of the plate surfaces a high precision of the angles of the prisms is achieved. In the simplest case, an alignment of all plates is achieved when the block is formed, with all plate surfaces of the plates being aligned at an angle $\alpha_1$, which is included between the plane face of the plates and a plane surface of an alignment plate that is part of a device for the adjustment of angles. Edges formed by the plate surfaces and the side faces of the plates contact the surface of the adjustment plate. The highest precision of position is achieved when, prior to alignment with the angle $\alpha_1$, a sharp edge of the block is produced. This sharp edge is brought into contact with the surface of the alignment plate each time the plates are aligned at the angle $\alpha$ on this surface. The plates of the displaced block are fixed in their inclined position. Several of the blocks displaced in this manner are cemented to a carrier body with the side of their cover faces and are processed by grinding and polishing on the side of their support face. First optically effective surfaces of the prisms are obtained.

If necessary, the alignment of plates is repeated several times with different settings of angles $\alpha$ in order to produce second optically effective surfaces and further surfaces by grinding and polishing. The rearrangement of plates is done after heating of the block by shifting the plates in the device for the adjustment of angles or by separating the plates from the block and renewed wringing of the plate surfaces of the plates. When all optically effective surfaces have been produced on the side of the support face and/or on the side of the cover face, the plates of the block are rearranged, wherein all plate surfaces of the plates are arranged at an angle β which is enclosed between the plane face of the plate and a plane face of an auxiliary plate. If the angle β is 90°, the thickness of each plate is identical to the hypotenuse of the later prism. The auxiliary plate is cemented to the side of the optically effective surfaces of the plates with the help of a fixation agent. During this process the projecting portions of each plate (its projecting tips) contact the surface of the auxiliary plate. Thereafter, prism strips are cut off at a distance a from and parallel to the surface of the auxiliary plate. After this cutting of prism strips at a distance a from the surface of the auxiliary plate, the exposed cut surfaces (hypotenuse) in connection with the auxiliary plate are processed by grinding and polishing, if needed.

By carrying out parallel sawing cuts that extend at an angle γ with respect to the prism strips, prisms are obtained. Preferably, the cuts are made at a right angle with respect to the prism strip. In one case, the auxiliary plate is only partially sawed from the side of the prism strips. Detachment of the prisms from the auxiliary plate is achieved by immersion into a solvent for the fixation agent.

In a second case, the auxiliary plate is sawed through together with the prism strips. The strips that carry the individual prisms are fixed onto a carrier in such a way that those faces (triangular faces) that have not been processed yet are processed by grinding and/or polishing. Thereafter, the prisms are detached from the strips. It is advantageous if in the course of production of the block, additionally to the support face, a cover face and/or an alignment face are processed by grinding and polishing in such a way that these faces are perpendicular to the plate surfaces of the plates. The processed cover face extends parallel to the support face. Due to the symmetry between the support and cover faces after angular alignment of all plates into an angular position α, additionally to the support face, the cover face can be processed. First, an optically effective face is produced at the support side of the plurality of blocks that are cemented onto a carrier body. Subsequently, after re-cementing to the side of the support faces on the carrier body, preferably the same optically effective surface is produced at the cover face. This procedure is repeated for every angular position α in order to obtain multi-faced prisms. Furthermore, an auxiliary plate is cemented to the cover face that is located opposite the support side. Also in this case, prism strips are cut off (by sawing) at a distance a from the surface of the auxiliary plate, followed by the further steps described above.

The process according to the invention makes it possible to produce prisms, especially microprisms, relatively inexpensively and with high quality. The technology according to the invention ensures a very good utilization of material and a high yield of good products. Large numbers can be produced relatively inexpensively in comparison to the known methods.

Beam-splitting prisms are obtained by the procedure described above if two individual plates are non-displaceably connected to each other so as to form a pair of plates, and a plurality of these pairs of plates are displaceably and detachably connected to each other.

The firm connection of the two plates belonging to a pair of plates is achieved, for example, by a heat-resistant cement between the faces of the plates. Between the rigidly connected plate surfaces of the plates a thin layer is embedded that produces the splitting of an incident beam. This thin layer is produced, for example, by vapor deposition onto the surface of the plate. The second plane face of the plate attached by cement protects the sensitive thin layer securely against damage during the following steps of processing.

According to the intended use of the beam-splitting device, the individual plates of a pair of plates may have the same thickness—e.g. when used as a beam-splitting cube—or they can be of different thickness—e.g. when used as a beam-splitting device in a binocular tube.

The invention is described in the following with the help of the Figures. The Figures show:

FIG. 1: plate

Figure 2:
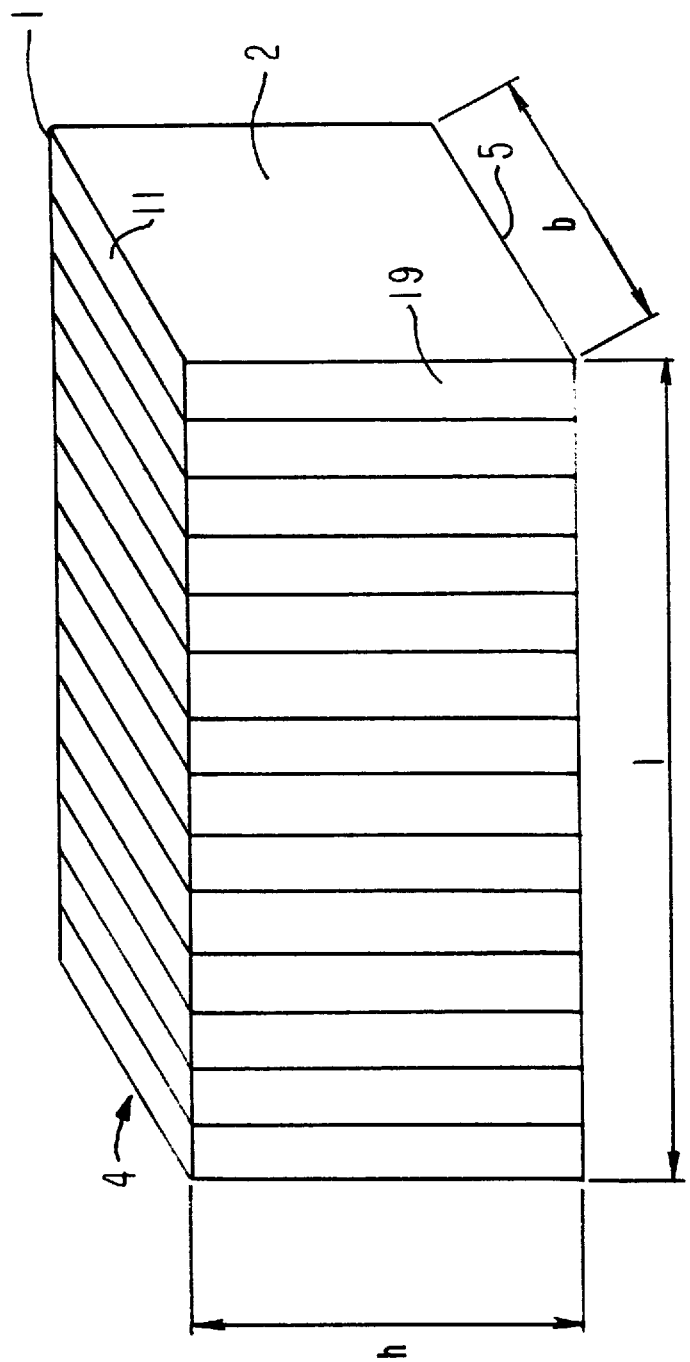

FIG. 2: vertically aligned block

Figure 3:
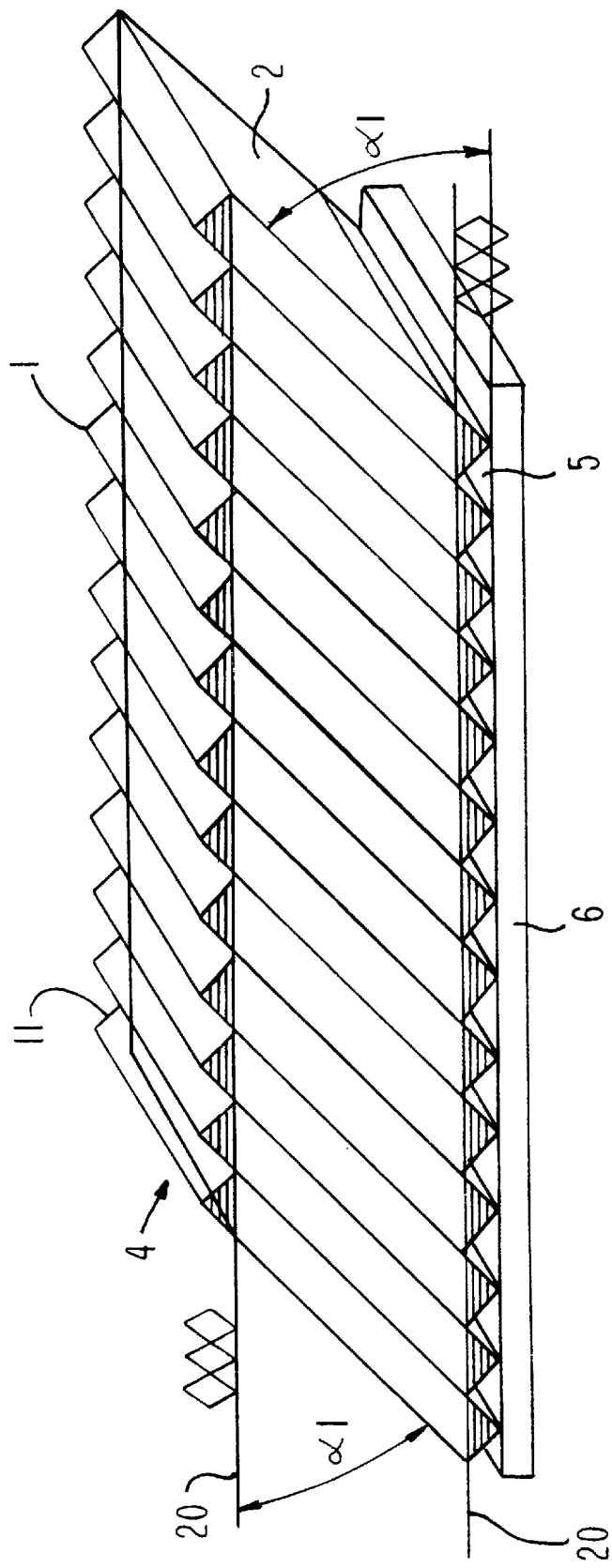

FIG. 3: displaced block, angle $\alpha_1$

Figure 4:
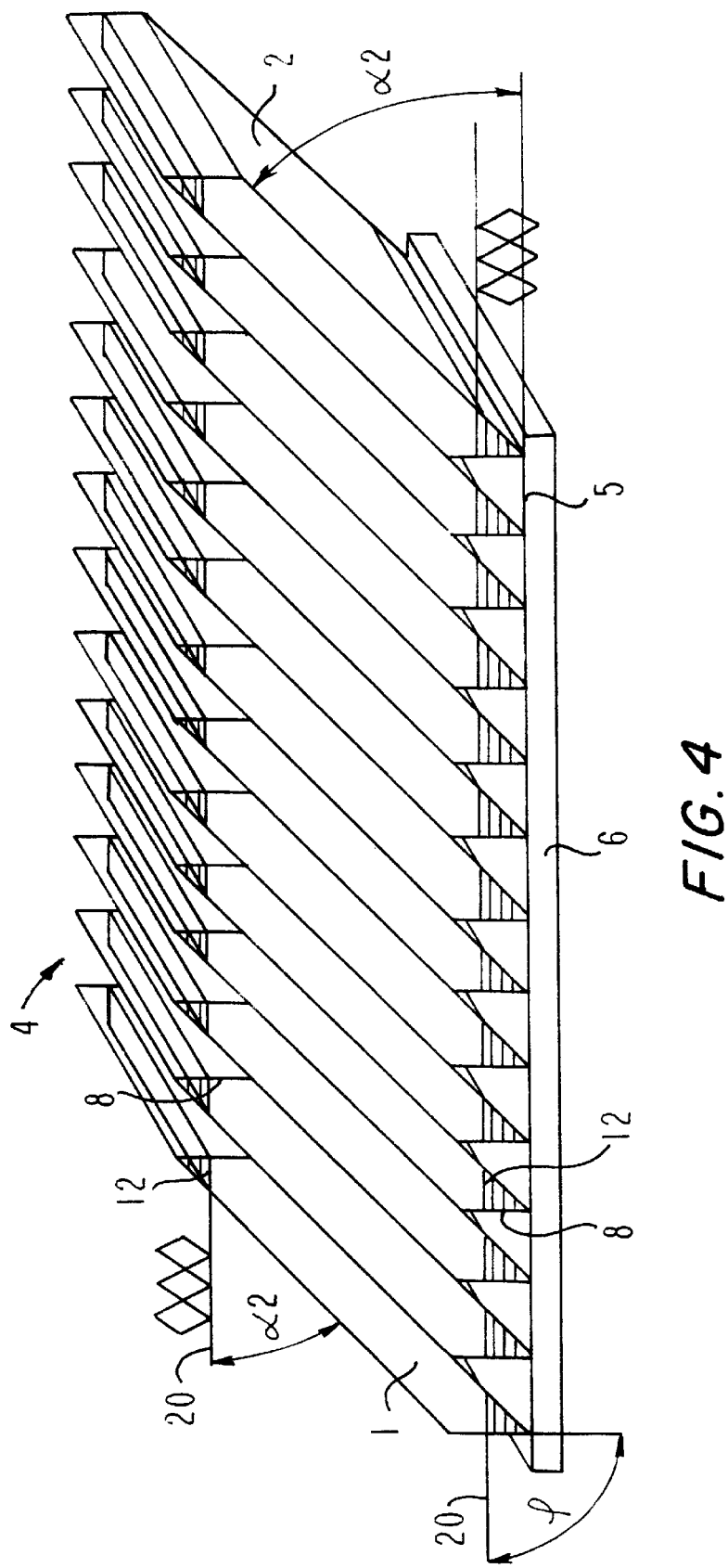

FIG. 4: displaced block, angle $\alpha_2$

FIG. 5: aligned block with cemented auxiliary plates

Figure 6:
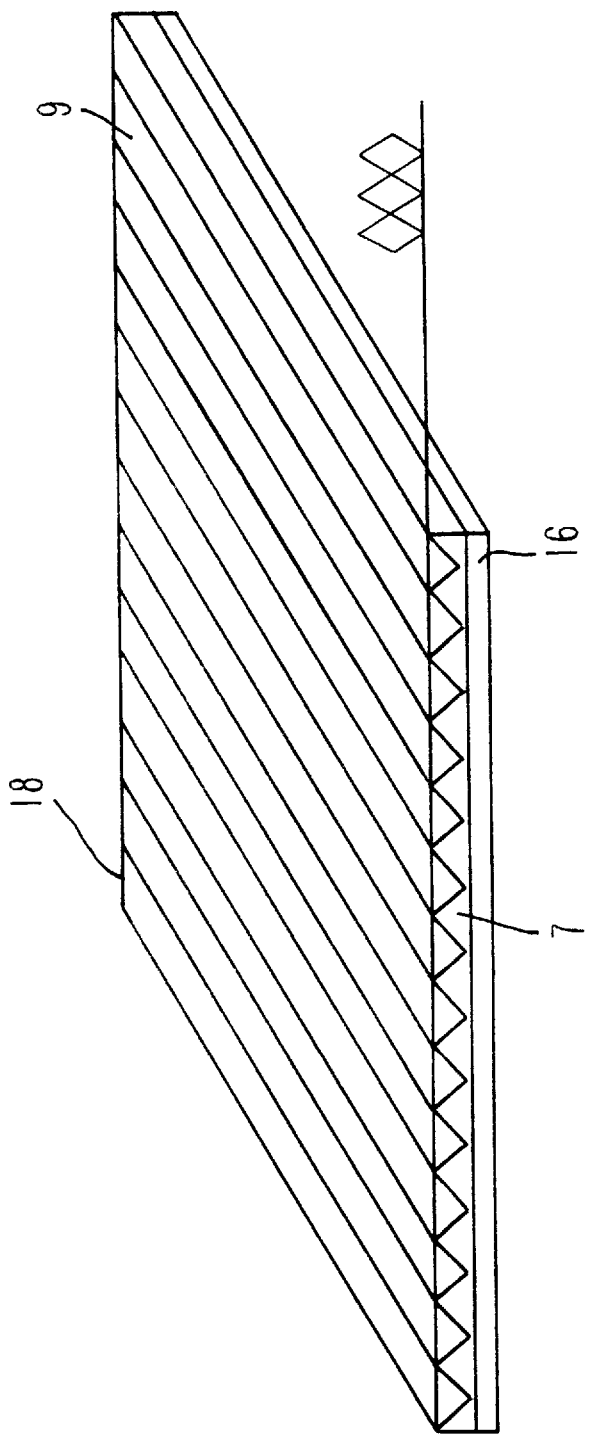

FIG. 6: prism strips on auxiliary plate

Figure 7:
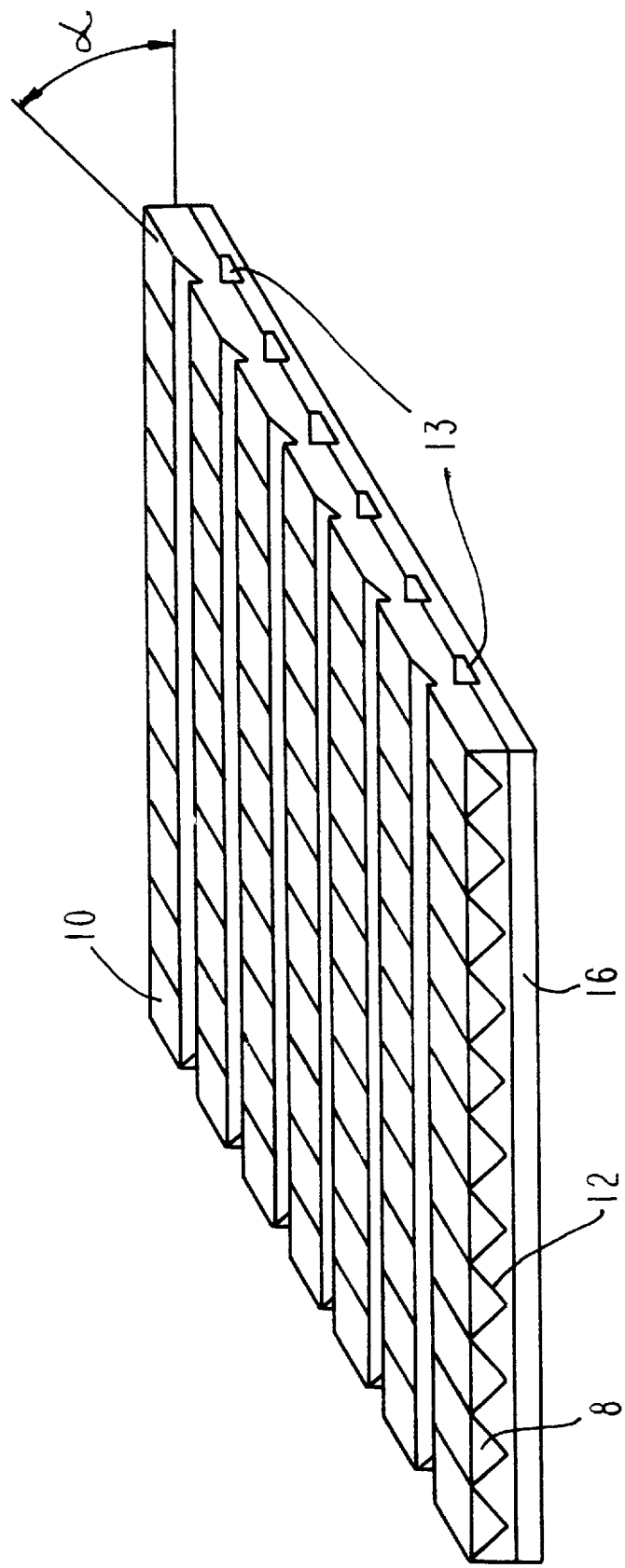

FIG. 7: prisms separated by sawing

FIGS. 8–15: shapes of prisms

FIG. 16: beam-splitting device

Figure 17:
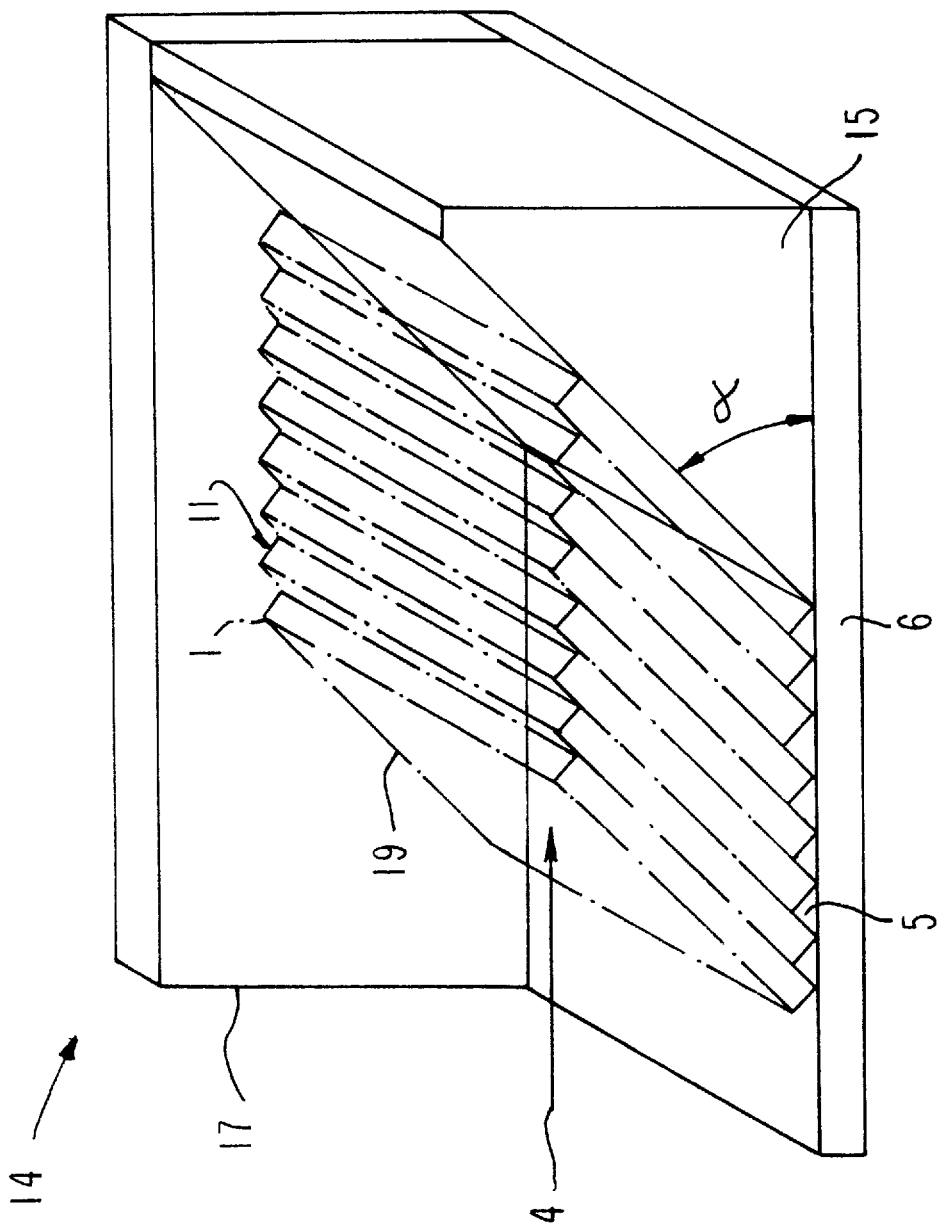

FIG. 17: alignment device

FIGS. 1 to 7 show the individual steps of the manufacture of microprisms by a gluing method. FIG. 1 shows an individual plate 1. The plate surfaces 2 are parallel to each other and ground and polished so as to be plane. The dimensions of the plates should be chosen relatively large; a large width b to obtain as many individual microprisms as possible, and a large height h to be able to carry out as many processing cycles as possible with precise angles of the prisms. The side faces 3 are cut to size. At a thickness d of 1 mm each, thirty of these plates 1 are connected to each other on their smoothly ground plate surfaces 2 with the help of a meltable fixation agent in such a way that a block 4 according to FIG. 2 is produced. During gluing the plates are aligned with their plate surfaces 2 extending parallel to each other. The side faces 3, designated as support face 5, cover face 11, and alignment face 19 in the following, are so smoothly ground that these side faces extend at a right angle to the plate surfaces 2. In doing so, the dimension h between the support face 5 and the cover face 11 is exactly ground across the whole length of the block 4.

It is important that a sharp edge for the later alignment of the plates 1 in the block 4 is obtained between the plate surfaces 2 of the plates and the support face 5 or the cover face 11, respectively.

According to FIG. 3, the block 4 prepared in this manner is placed onto an angle-adjustment device 14 (see FIG. 16) while it is still warm, and the plates 1 are displaced in such a way that all plates are aligned on an angle standard 15 at the angle $\alpha_1$. All projecting sharp edges that are formed by the plate surfaces 2 and the support faces 5 are in contact with the plane surface of the alignment plate 6, and an exposed plate surface 2 of the block is in contact with the face of the angle standard 15. Consequently, all plates 1 of a block 4 have the same inclination. Several displaced and cooled blocks of equal height h are cemented with the side of their cover faces 11 to a carrier body in such a way that the side of the blocks with the support faces 5 is exposed for processing (not shown). The blocks 4 are processed together by grinding and polishing them up to the polishing plane 20.

Due to the existing symmetry, first optically effective surfaces 8 can be produced at the side of the support faces 5, and after re-cementing the blocks 4 at the side of the support faces 5 the same processing steps can be carried out at the cover face 11. Equal prisms are obtained as a result.

Figure 8:
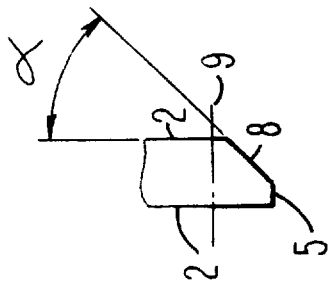

If plane surfaces are produced at the displaced blocks in the polishing plane 20, the plate surfaces 2 of the plates 1 are with sharp edges in contact with the first optically effective surface 8 (see FIG. 8).

Figure 9:
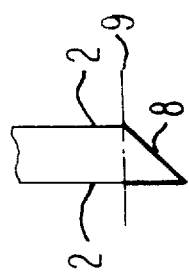

If the projecting tips of the displaced plates of the block are not entirely removed, a first optically effective surface 8 results which forms a sharp boundary with the remaining support face 5 or the cover face 11, respectively (see FIG. 9). In this case, if necessary, the support face 5 (or the cover face 11, respectively) may be polished before displacing the plates in the block (see FIG. 2).

The processing steps depicted in FIG. 3 and described above can be repeated with various arbitrary angles α in the range between the extreme values 0° and 180° in order to produce second optically effective surfaces 12.

FIG. 4 shows the processing of a second optically effective surface 12. In the example, the angle $\alpha_2$ is produced, which is equal to the angle $\alpha_1$. The angle φ of the prism results from the angles $\alpha_1$ plus $\alpha_2$. The plane of polishing 20 is chosen in such a way that isosceles prism faces result. After processing of the last optically effective surface, the plate surfaces 2 of the plates 1 of a block 4 are heated and aligned according to an angle β which, in the example, is 90° relative to the plane surface of the auxiliary plate 16, in order to obtain isosceles prisms (see FIG. 11).

According to FIG. 5, auxiliary plates 16 are fixed with a fixation agent 7 on those sides of the blocks that carry the optically effective surfaces. At a distance a from each auxiliary plate 16 a cut 13 by sawing parallel to the auxiliary plate 16 is made. The distance a is dimensioned such that prism strips 18 result which have, in the example, no more residual parts of plane surfaces 2. The resulting cut faces 9 are the hypothenuse faces of the prism strips 18 which are subsequently polished together with the auxiliary plate 16 (see FIG. 6).

Thereafter, the prism strips 18 that are cemented to the auxiliary plate 16 are cut into prisms under the cutting angle γ, which is 90° in the example (see FIG. 7). The cutting angle γ determines the angular position of these cut faces relative to the faces 2, 8, 9, and 12.

If the auxiliary plate is only partially sawed from the side of the prism strips 18, individual prisms can be removed after the immersion of the auxiliary plate into a solvent for the fixation agent. If the auxiliary plate with the supporting microprisms is cut through by sawing, the microprisms firmly attached to the auxiliary plate are supported in such a way that, if necessary, the cut faces (front and rear triangle faces) may be processed by grinding and/or polishing.

Figure 10:
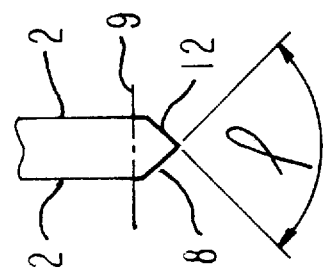
Figure 11:
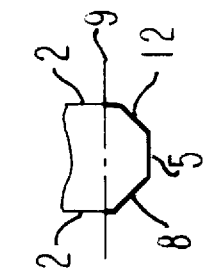

FIGS. 8 to 15 show several examples of prism shapes that can be obtained by the method according to the invention. If necessary, the front and rear faces of all prisms that are depicted in side views can be processed to be optically effective. According to FIG. 8, the plate surface 2, the first optically effective surface 8, and the cut face 9 can be optically effective surfaces. In FIG. 9, the supporting surface 5 additionally is an optically effective surface. In FIG. 10, the second optically effective surface is additionally produced. FIG. 11 depicts a isosceles prism having a first optically effective surface 8 and a second optically effective surface 12. Again in this case, the cut face 9 can be an optically effective surface. In the prism depicted in FIG. 12, the angle β between the plate surface 2 and auxiliary plate 16 (see FIG. 5) does not equal 90°. The sawing cut 9 parallel to the auxiliary plate 16 produces a parallelogram-shaped prism having the faces 2, 8, 2, and 9, each of which may be optically effective surfaces if needed. FIG. 13 shows a prism with the faces 2, 8, 12, 2, and 9, each of which may be optically effective if needed. FIG. 14 shows a prism with the faces 2, 8, 12, and 9. FIG. 15 shows a prism with the faces 2, 8.1, 8.2, 5, 12.1, 12.2, 2, and 9.

The first optically effective surfaces 8.1, 8.2 and the second optically effective surfaces 12.2, 12.2, are produced by different angular positions α. The possibilities of prism shapes shown in FIGS. 8 to 15 are certainly not complete. The shapes can be combined with each other and modified. The illustrations represent a selection of the multitude of possibilities to produce prisms by the method of this invention.

FIG. 16 schematically represents the processing steps for manufacturing beam-splitting prisms. FIG. 16a shows composite pairs of plates 2 which are displaceable relative to each other and enclose a transparent layer 21 between them. FIG. 16b shows the displaced pairs of plates 2 with a first optically effective surface 8 being processed to a final stage (polished). FIG. 16c depicts the position of the pairs of plates after re-cementing into another angle and with a second optically effective surface 12 obtained by grinding and polishing. According to FIG. 16d the second optically effective surfaces 12 of the pairs of plates are cemented to an auxiliary plate 16. By means of cutting by sawing, subsequent grinding, and polishing, a third optically effective surface is produced in the plane of polishing 20. If the outer surfaces of the plates possess optical quality, individual beam-splitting prisms are obtained after cutting the prism strips 18 horizontally with respect to the plane of the drawing, wherein the individual beam-splitting prisms can be used in a binocular tube.

Figure 16A:
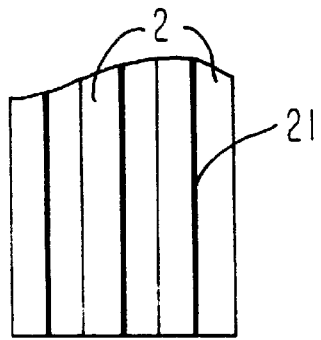
Figure 16B:
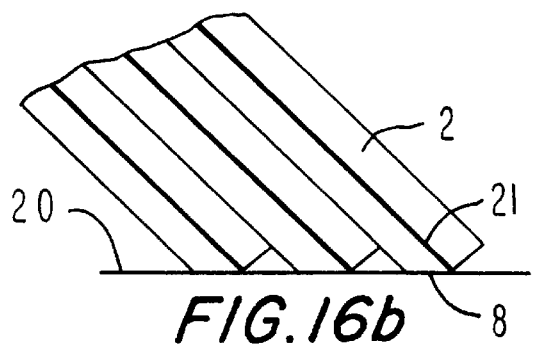
Figure 16C:
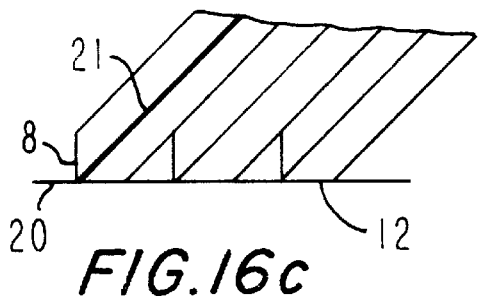
Figure 16D:
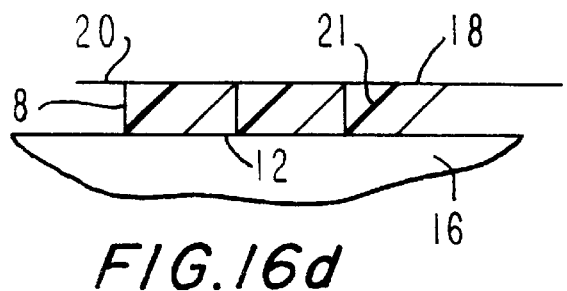
Figure 16E:
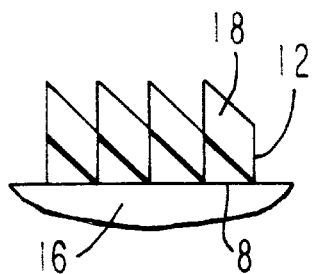
Figure 16F:
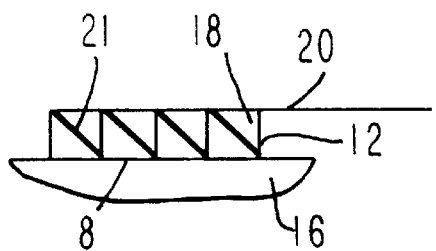

A beam-splitting cube according to FIG. 16f is obtained by processing a forth optically effective surface. This is done by separating the prism strips of FIG. 16d and cementing them to a further auxiliary plate 16 with their first optically effective surfaces, as shown in FIG. 16e. After grinding and polishing in the plane of polishing 20, the prism strips 18 are cut in the plane of the drawing, yielding individual beam-splitting cubes.

FIG. 17 shows a device for the alignment of blocks 4 according to the angle α. This angular alignment device is composed of a planar alignment plate 6 on which the angular standard 15 is placed. For the lateral alignment of the plates 1 of a block 4, the angular alignment device 14 has a stop 17. The plates 1 are aligned with their alignment faces 19 at the stop 17. A plate surface 2 of a plate 1 rests on the angle standard 15. A sharp edge formed by the plate face 2 and the support face 5 is in contact with the surface of the alignment plate 6. The further plates 1 are in contact with each other via their plate surfaces 2 and thus receive the same orientation.

The method has been described with the example of microprisms. However, the method is also well suited for the production of prisms as the are usually produced and the dimensions of which are in the order of centimeters.

REFERENCE NUMERALS 1 plate, pair of plates
2 plate surface
3 side face
4 block 5 support face
6 alignment plate
7 fixation agent
8 first optically effective surface
9 plane of cut (hypotenuse)
10 microprism
11 cover face
12 second optically effective surface
13 sawing cut
14 angular alignment device
15 angle standard
16 auxiliary plate
17 stop
18 prism strip
19 alignment face
20 polishing plane
21 transparent layer
a distance
b width of plate
c thickness of plate
d height of plate
l length of block
α angle between plate surface (2) and support face (5)
β angle between plate surface (2) and surface of the auxiliary plate (16)
φ angle of prism
γ angle of cut

I claim:

1. A method of manufacturing prisms, particularly microprisms and beam-splitting prisms, from rectangular plane-parallel plates, including the steps of:
   a) producing rectangular plates, each plate having plane-parallel plate surfaces, a support face, and a cover face;
   b) stacking a plurality of these plates on top of each other on their plate surfaces, wherein the plates are aligned on at least two of their side faces and on their plate surfaces to form a rectangular block;
   c) placing all plates of the block into an inclined arrangement plate, such that each of the plates of the block lie with a support face edge on said plane alignment plate, and that all plate surfaces assume a predetermined first angle relative to the plane surface of the alignment plate, and fixing the plates in their position of relative displacement;
   d) cementing a carrier body onto several blocks with inclined plates that have been produced according to steps a) to c), wherein the carrier body is cemented to the stepped cover faces of the inclined plates;
   e) grinding and polishing the projecting support faces of the exposed side of the blocks for producing optically effective projecting parts;
   f) repeating steps c) through e) several times with inclinations differing from said first angle, and repeating step e) to produce further optically effective projecting parts by grinding and polishing;
   g) rearranging the plates of the blocks such that all plate surfaces are arranged at a predetermined angle with respect to the plane surface of an auxiliary plate;
   h) cementing the auxiliary plate to the blocks at the side with the optically effective projecting parts, wherein the projecting parts of the individual plates are placed on the surface of the planar auxiliary plate;
   i) cutting a plate of prism strips out of the blocks by sawing the blocks in a plane parallel to the plane of the auxiliary plate, the plane of cutting within the blocks being arranged such that its distance to the projecting parts of the optically effective surfaces on the auxiliary plate corresponds to the height of the prisms;
   j) cutting individual prisms by sawing the prism strips with cuts that are parallel to each other at a predetermined angle relative to the longitudinal direction of the prism strips; and
   k) detaching the cut prisms from the auxiliary plate.

2. The method according to claim 1, comprising producing the plate surfaces by smooth grinding.

3. The method according to claim 1, comprising producing the plate surfaces by smooth grinding and polishing.

4. The method according to claim 1, comprising fixing the plates stacked according to step (b) to form a block using a meltable fixation agent.

5. The method according to claim 1, comprising fixing the plates stacked according to step (b) to form a block by wringing.

6. The method according to claim 1, comprising carrying out the rearrangement of the plates according to step (g) after heating the block by displacing the individual plates.

7. The method according to claim 1, comprising carrying out the rearrangement of the plates according to step (g) by separating the plates from the block and by wringing.

8. The method according to claim 1, wherein the angle of rearrangement according to step (g) is 90°, whereby a thickness of each plate equals the hypotenuse of the prism.

9. The method according to claim 1, wherein the side faces have edges, the edges of the side faces resting on the alignment plate according to step (c) including a right angle with the plate surface next to the side edge, and wherein sharp edges resulting from the inclined placement of the plates are in contact with the surface of the alignment plate.

10. The method according to claim 9, comprising additionally smooth grinding an oppositely located or another side face such that the face extends at a right angle relative to the plate surfaces.

11. The method according to claim 9, comprising additionally smooth grinding and polishing an oppositely located or another side face such that the face extends at a right angle relative to the plate surfaces.

12. The method according to claim 10, comprising, after carrying out step (e), cementing the carrier body to the side of the block having the optically effective surfaces, and producing optically effective surfaces by grinding and polishing projecting parts of the single plates on an exposed side.

13. The method according to claim 10, comprising, after carrying out step (f), cementing the carrier body to the side of the block having the optically effective surfaces, and producing optically effective surfaces by grinding and polishing projecting parts of the single plates on an exposed side.

14. The method according to claim 12, comprising, after producing the optically effective surfaces, cementing an auxiliary plate to an exposed side of the block, and cutting a plate of prism strips by sawing the block in a plane parallel to the plane of the auxiliary plate, and choosing the plane of sawing such that a distance of the plane to the parts of the optically effective surfaces projecting on the side of the block corresponds to the height of the prism.

15. The method according to claim 1, comprising carrying out the sawing cuts of step (j) at a right angle to the prim strips.

16. The method according to claim 1, comprising, after cutting off the plate of prism strips, processing exposed cutting planes of the prism strip together with the auxiliary plate by grinding and polishing.

17. The method according to claim 1, comprising carrying out step (j) by only partially sawing the auxiliary plate from the side of the prism strips and fixing the strips carrying the single prisms on a carrier body such that not yet processed side faces of the prisms can be processed by at least one of grinding and polishing.

18. The method according to claim 1, comprising carrying out step (j) by sawing through the auxiliary plate from the side of the prism strips and fixing the strips carrying the single prisms on a carrier body such that not yet processed side faces of the prisms can be processed by at least one of grinding and polishing.

19. The method according to claim 1, comprising indisplacably connecting two plates to each other to form a pair of plates, and embedding a thin layer between connected plate surfaces, wherein neighboring pairs of plates are displacable with respect to each other.

* * * * *